US012566848B2

(12) United States Patent
Sivaraman et al.

(10) Patent No.: US 12,566,848 B2
(45) Date of Patent: Mar. 3, 2026

(54) AUTOMATED THREAT MODELING

(71) Applicant: Dell Products L.P., Round Rock, TX (US)

(72) Inventors: Sanal Kumar Kariyezhath Sivaraman, Chennai (IN); Parameswaran Krishnamurthy, Chennai (IN)

(73) Assignee: Dell Products L.P., Round Rock, TX (US)

( * ) Notice: Subject to any disclaimer, the term of this patent is extended or adjusted under 35 U.S.C. 154(b) by 46 days.

(21) Appl. No.: 18/679,596

(22) Filed: May 31, 2024

(65) Prior Publication Data

US 2025/0371144 A1 Dec. 4, 2025

(51) Int. Cl.
*G06F 21/55* (2013.01)
(52) U.S. Cl.
CPC ................................. *G06F 21/554* (2013.01)
(58) Field of Classification Search
CPC ...................................................... G06F 21/554
See application file for complete search history.

(56) References Cited

U.S. PATENT DOCUMENTS

2024/0289367 A1 * 8/2024 Murphy .............. H04L 63/1441
2024/0348638 A1 * 10/2024 Tejvir .................... G06F 21/577

FOREIGN PATENT DOCUMENTS

WO WO-2021144978 A1 * 7/2021 ............. G06F 21/55

* cited by examiner

*Primary Examiner* — Joe Chacko
(74) *Attorney, Agent, or Firm* — Chamberlain, Hrdlicka, White, Williams & Aughtry; Aly Z. Dossa

(57) ABSTRACT

Techniques described herein relate to a method for performing threat modeling. The method includes obtaining a threat modeling request associated with a process executing on a node of a cluster; in response to the obtaining: generating node information associated with the process; generating a data flow diagram associated with the process using the node information; comparing the node information with a threat database to predict at least one threat associated with the process; generating a threat report based on the at least one threat; providing the threat report and data flow diagram to a user associated with the process; and initiating performance of threat mitigation based on the threat report and the data flow diagram.

17 Claims, 7 Drawing Sheets

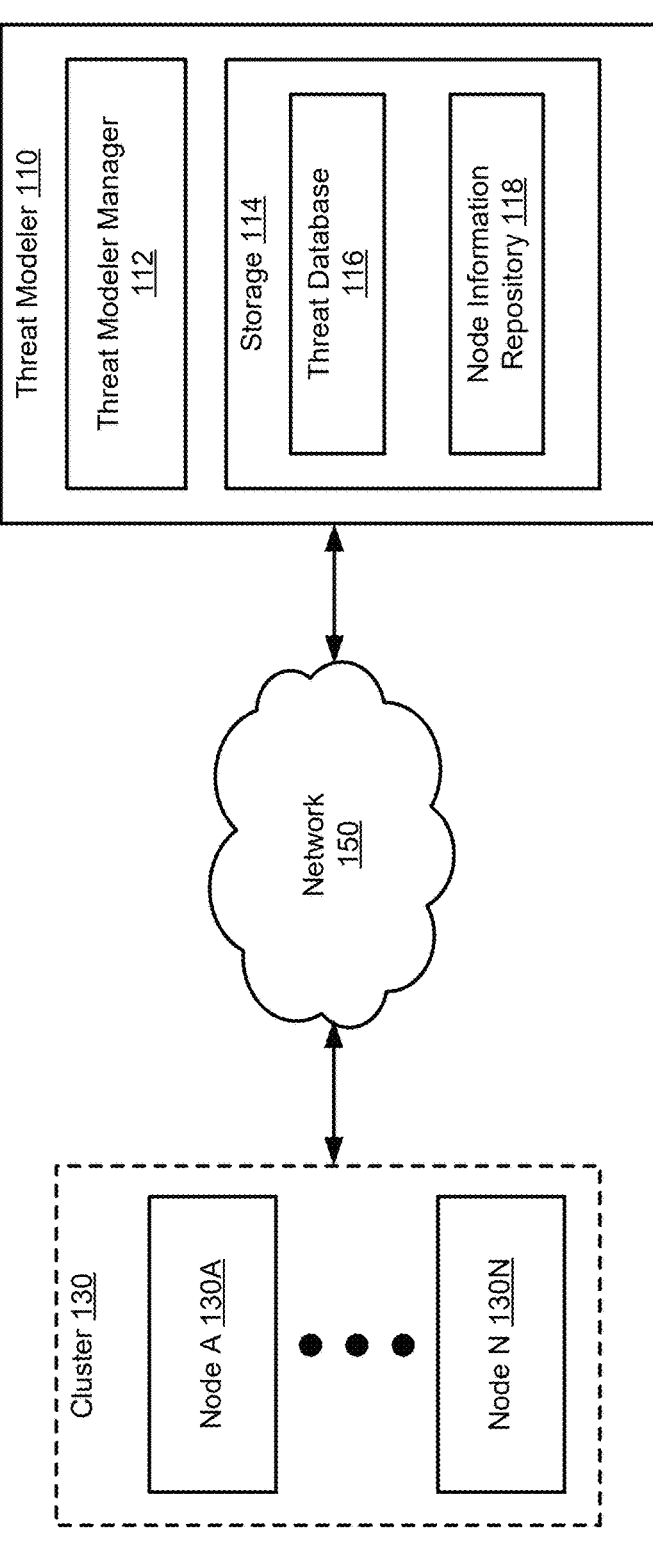
FIG. 1.1

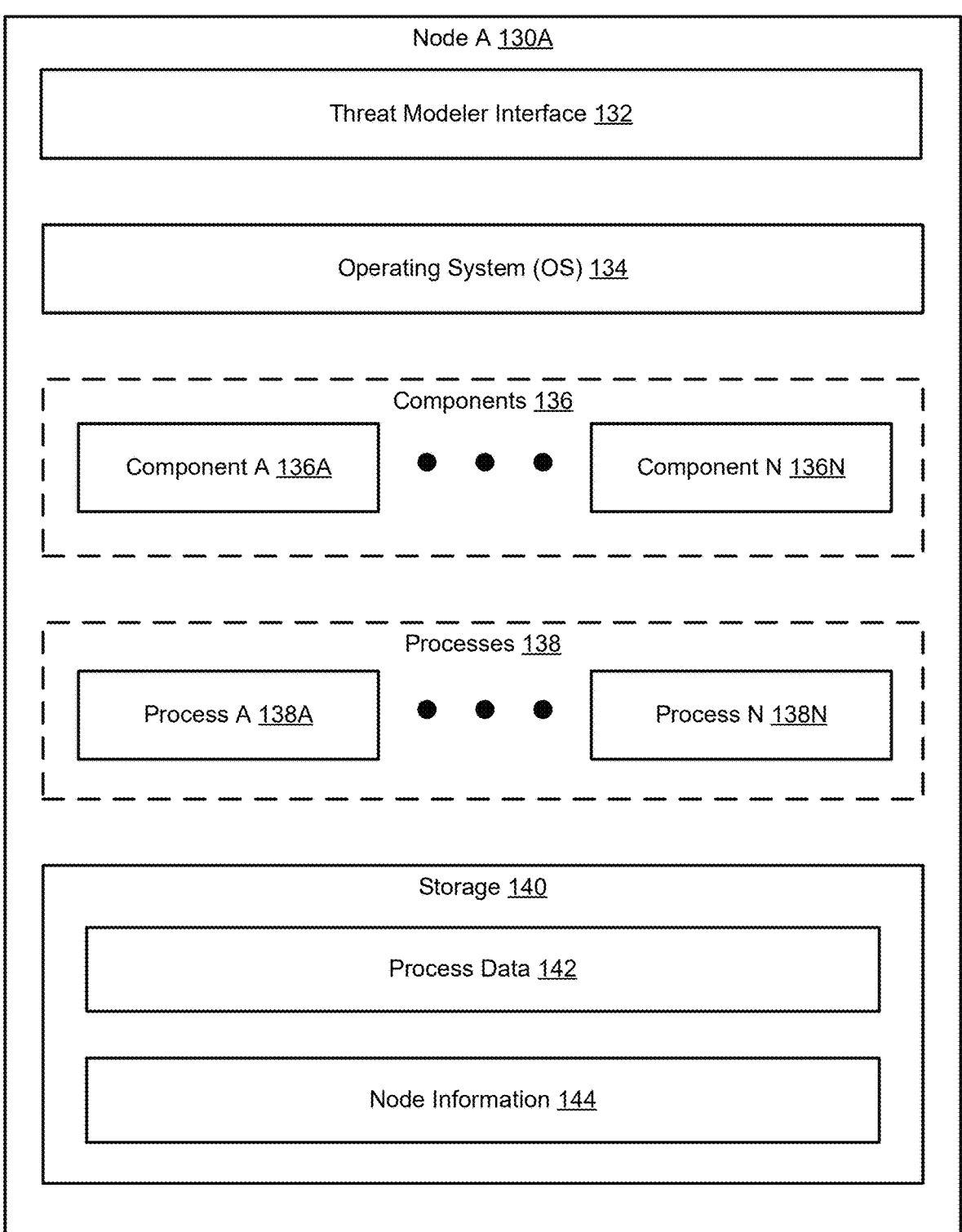
FIG. 1.2

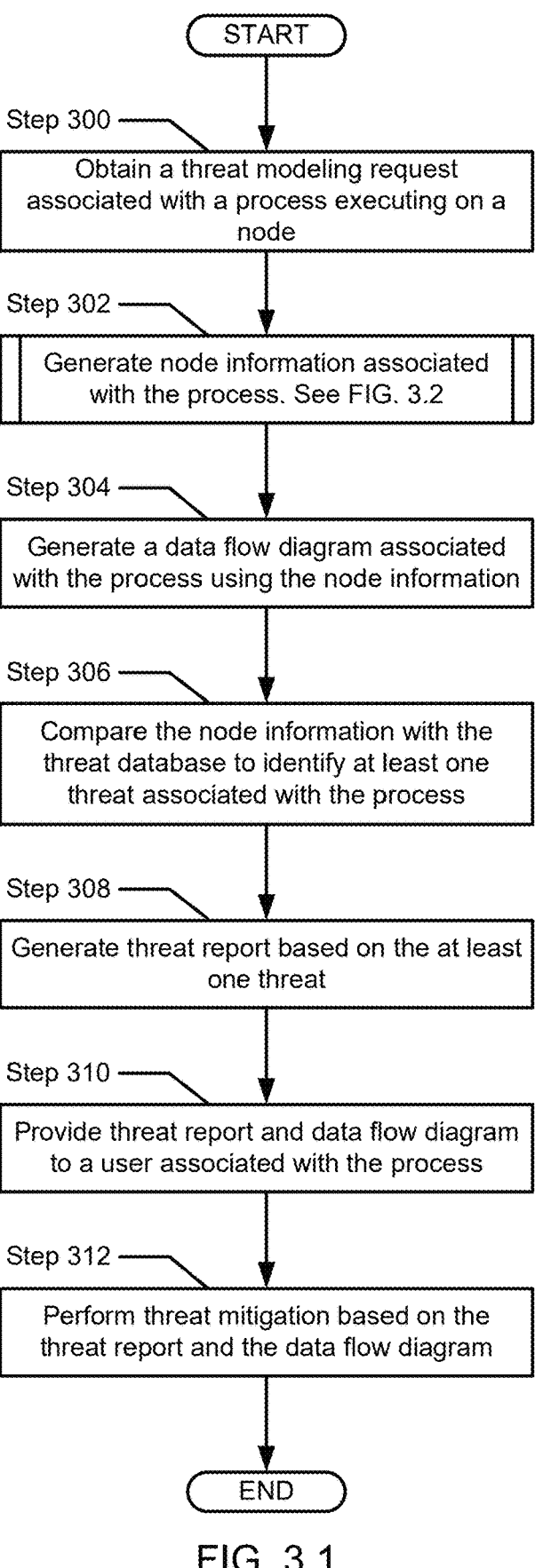
FIG. 3.1

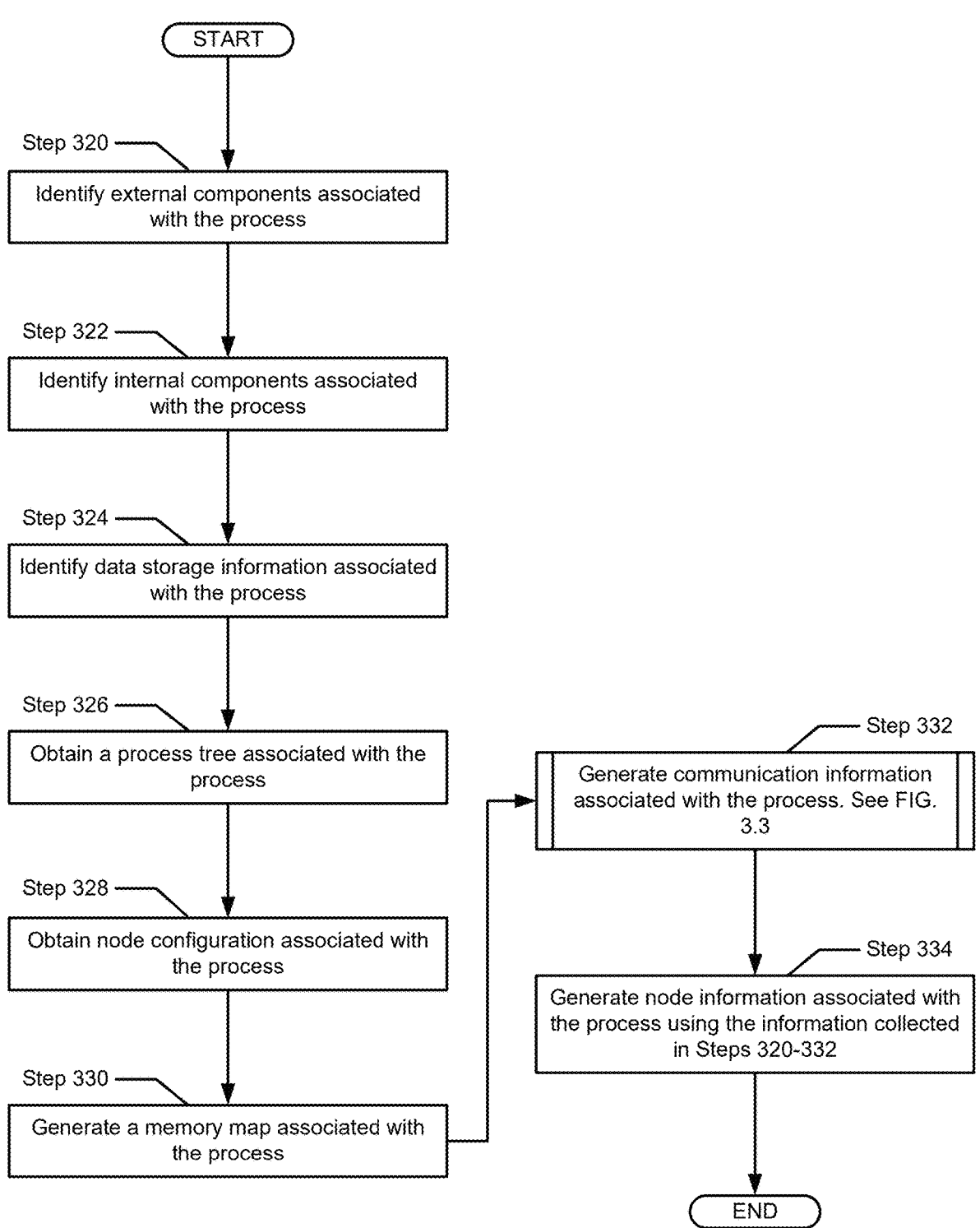
FIG. 3.2

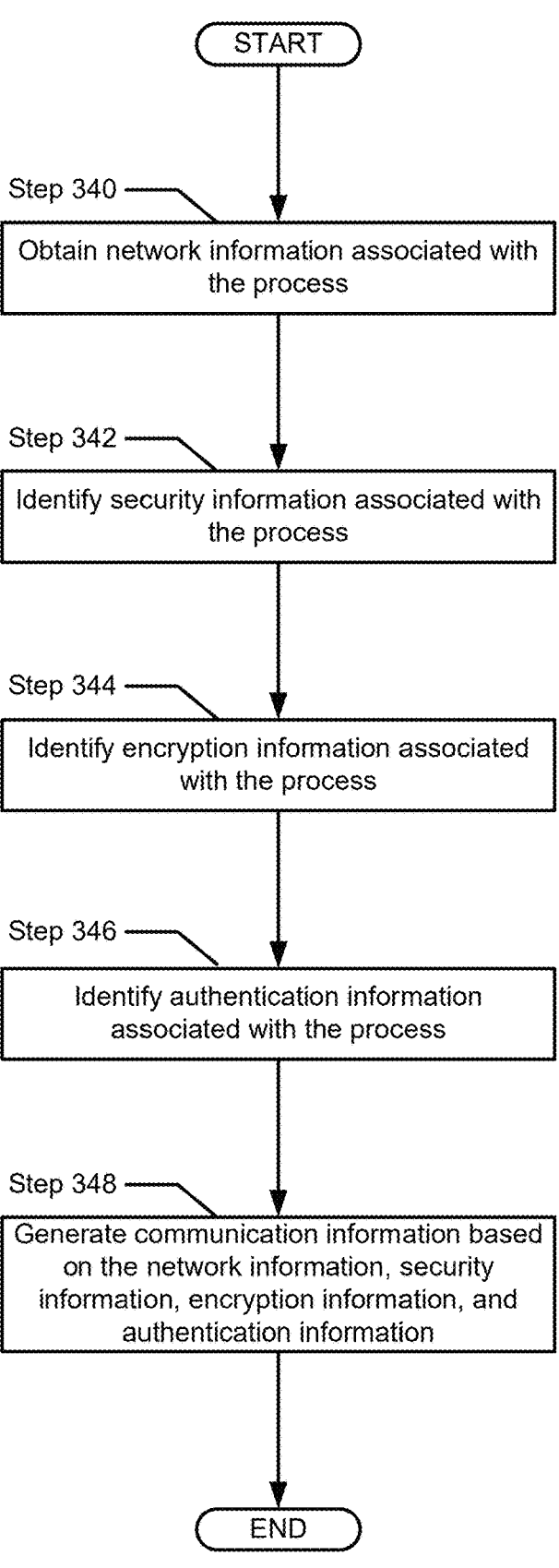

START

Step 340 ——

Obtain network information associated with the process

Step 342 ——

Identify security information associated with the process

Step 344 ——

Identify encryption information associated with the process

Step 346 ——

Identify authentication information associated with the process

Step 348 ——

Generate communication information based on the network information, security information, encryption information, and authentication information

END

AUTOMATED THREAT MODELING

BACKGROUND

Computing devices may provide services for users. To provide the services, the computing devices may execute processes that provide at least a portion of the services. The computing devices may coordinate with other computing devices during the execution of the processes. The computing devices in the computing environment may be susceptible to threats from nefarious users. To protect the computing devices and data in the computing environment, the threats may be searched for and identified. Identified threats may be remediated to mitigate damages associated with the identified threats.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments disclosed herein.

FIG. 1.2 shows a diagram of a node in accordance with one or more embodiments disclosed herein.

FIG. 3.1 shows a flowchart of a method for performing threat modeling in accordance with one or more embodiments disclosed herein.

FIG. 3.2 shows a flowchart of a method for generating node information in accordance with one or more embodiments disclosed herein.

FIG. 3.3 shows a flowchart of a method for generating communication information in accordance with one or more embodiments disclosed herein.

DETAILED DESCRIPTION

Figure 2:
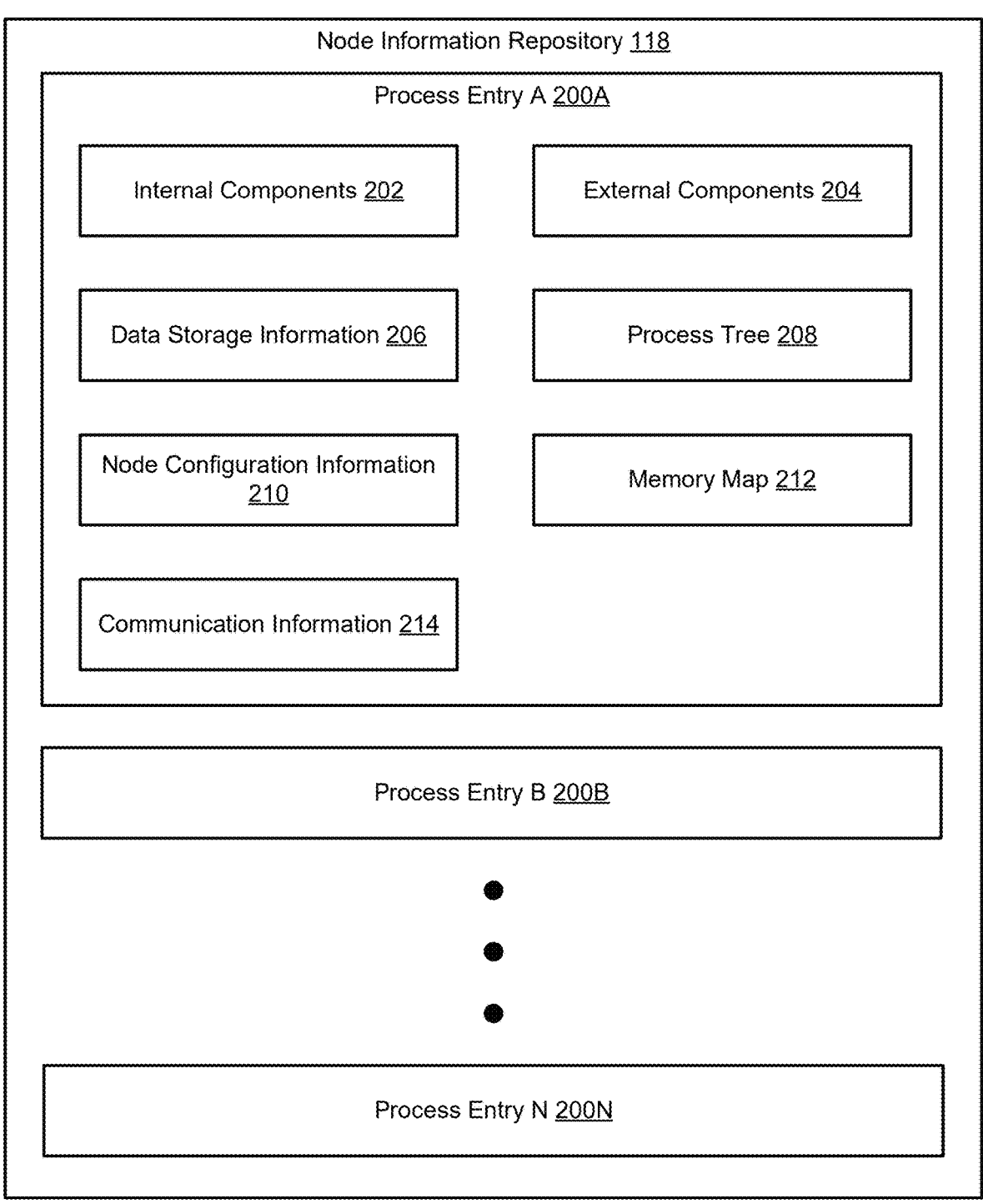
FIG. 2 shows a diagram of a node information repository in accordance with one or more embodiments disclosed herein.

Specific embodiments will now be described with reference to the accompanying figures. In the following description, numerous details are set forth as examples of the embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to methods, systems, and/or non-transitory computer readable mediums for performing threat modeling for a cluster.

In one or more embodiments, a threat model may be a model that identifies or otherwise predicts potential security threats associated with processes executing in a cluster. Traditionally, the threat model may be a part of design phase in secure development life cycle. However, it may be difficult to define a complete threat model in design phase of computing systems, applications, services, etc. that addresses all the security threats that may arise during actual implementation. This problem may arise due to the following: (i) lack of competency, time, and/or effort required for implementing threat modeling, (ii) design changes after threat modeling, (iii) usage of different mechanisms that are introduced over time as part of implementation, and (iv) the design phase threat model may not consider some of runtime aspects such as the user context, memory usage, permission of the data storage mechanism actual encryption/authentication parameters that are used, etc. As part of Security Development Lifecycle (SDL), a threat model may be mandatory for all the features on the system. Another problem may be that it is tough to make threat models for legacy features on the system.

To address, at least in part, the problems discussed above, embodiments disclosed herein relate to methods, systems, and/or non-transitory computer readable mediums to enable an automated system to define the threat model and predict the threats based on the actual inputs from a running computing system. The threat modeling may be performed during the unit testing phase or later based on actual input, instead of theoretical or manual user input in the design phase. Additionally, by running the threat model framework for a process on the same system, the tests may be more detailed and focused to provide a tangible outcome in terms of predictable threats. Alternatively, this may be enhanced to run remotely by accessing the system under test. The threat model system may be used with a running process. The process may refer to a standard Linux daemon application, a microservice, or any other process without departing from embodiments disclosed herein. Accordingly, the security of systems may be improved and the damage associated with potential and actual identified threats may be greatly mitigated.

FIG. 1.1 shows a diagram of a system in accordance with one or more embodiments disclosed herein. The system (100) may include a threat modeler (110), a cluster (130), and a network (150). The components of the system (100) illustrated in FIG. 1.1 may be operatively connected to each other and/or operatively connected to other entities (not shown) via any combination of wired (e.g., Ethernet) and/or wireless networks (e.g., local area network, wide area network, Internet, etc.) without departing from embodiments disclosed herein. Each component of the system illustrated in FIG. 1.1 is discussed below.

In one or more embodiments, the threat modeler (110) may be configured to include the functionality to perform threat modeling services for the cluster (130). The threat modeling services may include generating node information associated with a process executing on one or more nodes (e.g., 130A, 130N) of the cluster (130), comparing the node information with the threat database (116) to identify threats associated with the process, generating data flow diagrams associated with the process, generating a threat report associated with the threats, and performing threat remediation based on the threat report and the data flow diagram. The threat modeler (110) may include the functionality to perform all, or a portion, of the methods discussed in FIGS. 3.1-3.3. The threat modeler (110) may include other and/or additional functionalities without departing from embodiments disclosed herein.

In one or more embodiments, the threat modeler (110) may be implemented using one or more computing devices. In one or more embodiments, a computing device may be any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors (not shown) for obtaining data, and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyper-converged infrastructure, a cluster, a virtual machine, a logical container (e.g., for one or more applications), a cloud resource, and/or any other type of device with the aforementioned requirements.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium. For additional information regarding computing devices, refer to FIG. 4.

The threat modeler (110) may be implemented using logical devices without departing from the embodiments disclosed herein. For example, the threat modeler (110) may include virtual machines that utilize computing resources of any number of physical computing devices to provide the functionality of the threat modeler (110). The threat modeler (110) may be implemented using other types of logical devices without departing from the embodiments disclosed herein.

As discussed above, the threat modeler (110) may include the functionality to perform threat modeling services for the cluster (130). To perform the aforementioned services, the threat modeler (110) may include a threat modeler manager (112) and storage (114). The threat modeler (110) may include additional, fewer, and/or other components without departing from embodiments disclosed herein. Each of the aforementioned components of the threat modeler (110) is discussed below.

In one or more embodiments, the threat modeler manager (112) may be configured to perform the threat modeling services of the threat modeler (110). Accordingly, the threat modeler manager (112) may generate node information associated with a process executing on one or more nodes (e.g., 130A, 130N) of the cluster (130), compare the node information with the threat database (116) to identify threats associated with the process, generate data flow diagrams associated with the process, generate a threat report associated with the threats, and perform threat remediation based on the threat report and the data flow diagram. The threat modeler manager (112) may include the functionality to perform all, or a portion, of the methods discussed in FIGS. 3.1-3.3.

In one or more embodiments, the threat modeler manager (112) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the threat modeler manager (112) described throughout this Detailed Description.

In one or more embodiments disclosed herein, the threat modeler manager (112) may be implemented as computer instructions, e.g., computer code, stored on a storage (e.g., 114) that when executed by a processor of the threat modeler (110) causes the threat modeler (110) to provide the functionality of the threat modeler manager (112) described throughout this Detailed Description.

In one or more embodiments, the storage (114) may be implemented using one or more volatile or non-volatile storages or any combination thereof. The storage (114) may include the functionality to, or otherwise be configured to, store and provide all, or portions, of information that may be used by the threat modeler (110) and the threat modeler manager (112). The information stored in the storage (114) may include a threat database (116) and a node information repository (118). The storage (114) may include other and/or additional information without departing from embodiments disclosed herein. Each of the aforementioned types of information is discussed below.

In one or more embodiments, the threat database (116) may include one or more data structures that include one or more threats. The threat database (116) may include any quantity of threats without departing from embodiments disclosed herein. Each threat may be associated with corresponding threat information. The threat information may include corresponding node information. The node information may include all, or a portion of, the node information of the node information repository (118) (e.g., internal components, external components, data storage information, process trees, node configuration information, memory maps, communication information, etc.) discussed below. The threat information may further include a threat identifier. A threat identifier may refer to unique combination of alphanumeric characters associated with a particular threat that specifies the particular threat from other threats. The threat information may further include a threat description that includes any quantity and/or type of human readable text that describes the threat. For example, a threat description may include: "data flow with external components is insecure", "data file type is a text file," "data file permission is accessible to user or groups other than process owner", etc. The threat information may still further include a severity associated with the corresponding threat. The severity may be any form of representation of the potential risk associated with the threat. For example, the severity may be represented as high, medium, or low, or represented on a numerical scale from one to ten with ten being the highest severity, etc. The threat information may further include a condition associated with the threat. The condition may include a portion of the node information that triggers or causes, at least in part, the threat associated with the condition. The threat information may include one or more mitigation steps associated with the threat. A mitigation step may be an action that may be performed to remediate or mitigate the corresponding threat. The mitigation step may include any action without departing from embodiments disclosed herein. The mitigation step may include, for example, removing unknown user from data file permissions, updating user credentials, closing ports associated with processes, changing data file types, changing authentication methods, adding authentication methods, etc.

In one or more embodiments, the threat database (116) may be generated by users (e.g., system administrators, software developers, etc.), manufacturers of the nodes (e.g., 130A, 130N) or components thereof, or any third party entity without departing from embodiments disclosed herein. The threat database (116) may be updated over time by the threat modeler manager (112) using information obtained from the users (e.g., system administrators, software developers, etc.), manufacturers of the nodes (e.g., 130A, 130N) or components thereof, or any third party entity as new threats emerge, changes to the cluster (130) are made, etc. The threat database (116) may be updated to include new threats, remove threats, and/or modify threat information associated with existing threats. The threat database (116) may be used by the threat modeler manager (112) to perform threat modeling for processes executing in the cluster (130). The threat database (116) may include other and/or additional information and may be used for other and/or additional purposes without departing from embodiments disclosed herein.

In one or more embodiments, the node information repository (118) may include one or more data structures that include process entries. Each process entry may include node information associated with a process executing on a node (e.g., 130A) in the cluster (e.g., 130). The node information repository (118) may be an embodiment of the node information repository (118) discussed below in FIG. 2. For additional information regarding the node information repository (118), refer to FIG. 2.

While the data structures (e.g., 116, 118) and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (140), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

Returning to the discussion of the system (100), in one or more embodiments, the cluster (130) may perform computer implemented services for users (not shown). The computer implemented services may include any quantity and/or type of computer implemented services without departing from embodiments disclosed herein. The computer implemented services may include, for example, word processing services, calendar services, machine learning model training services, inferencing services, database services, data processing services, data storage services, etc. To perform the computer implemented services, the cluster (130) may include nodes (e.g., 130A, 130N). The cluster (130) may include any quantity of nodes (130A, 130N) without departing from embodiments disclosed herein. For example, the cluster (130) may include node A (130A) and node N (130N). Each node (e.g., 130A, 130N) may be configured to include the functionality to perform a portion of the computer implemented services provided by the cluster (130). For example, node A (130A) may perform database services and node N (130N) may perform machine learning model training services. Each node may perform a portion of the computer implemented services independently or in cooperation (e.g., pass data, requests, and/or processes to/from one or more other nodes) with other nodes. The nodes (130A, 130N) may include the functionality to perform all, or a portion of, the methods of FIGS. 3.1-3.3. The cluster (130) and the nodes (130A, 130N) may include other and/or additional functionalities without departing from embodiments disclosed herein. For additional information regarding nodes (130A, 130N), refer to FIG. 1.2.

In one or more embodiments, the nodes (130A, 130N) may be implemented using one or more computing devices.

The computing devices may be embodiments of the computing device discussed above. For additional information regarding computing devices, refer to FIG. 4.

In one or more embodiments, the nodes (130A, 130N) may be implemented using logical devices without departing from the embodiments disclosed herein. For example, the nodes (130A, 130N) may include virtual machines that utilize computing resources of any number of physical computing devices to provide the functionality of the nodes (130A, 130N). The nodes (130A, 130N) may be implemented using other types of logical devices without departing from the embodiments disclosed herein.

In one or more embodiments, the network (150) may be implemented using may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the network (150) described herein and/or all, or a portion, of the methods illustrated in FIGS. 3.1-3.3. The network (150) may be implemented using other types of computing devices without departing from the embodiments disclosed herein. For additional details regarding computing devices, refer to FIG. 4.

The network (150) may be implemented using logical devices without departing from the embodiments disclosed herein. For example, the network (150) may include virtual machines that utilize computing resources of any number of physical computing devices to provide the functionality of the network (150). The network (150) may be implemented using other types of logical devices without departing from the embodiments disclosed herein.

In one or more embodiments, the network (150) may represent a (decentralized or distributed) computing network and/or fabric configured for computing resource and/or messages exchange among registered computing devices (e.g., the nodes (e.g., 130A, 130N) of the cluster (130), the threat modeler (110), and users (not shown)). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (150) may be implemented using any combination of wired and/or wireless network topologies, and the network may be operably connected to the Internet or other networks. Further, the network (150) may enable interactions between, for example, the nodes (e.g., 130A, 130N) of the cluster (130), the threat modeler (110), users (not shown), and/or other entities not shown in FIG. 1.1 through any number and type of wired and/or wireless network protocols (e.g., TCP, UDP, IPv4, etc.).

The network (150) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (150) and its subcomponents may be implemented using hardware, software, or any combination thereof.

In one or more embodiments, before communicating data over the network (150), the data may first be broken into smaller batches (e.g., data packets) so that larger size data can be communicated efficiently. For this reason, the network-enabled subcomponents may break data into data packets. The network-enabled subcomponents may then route each data packet in the network (150) to distribute network traffic uniformly.

In one or more embodiments, the network-enabled subcomponents may decide how real-time (e.g., on the order of milliseconds or less) network traffic and non-real-time network traffic should be managed in the network (150). In one or more embodiments, the real-time network traffic may be high-priority (e.g., urgent, immediate, etc.) network traffic. For this reason, data packets of the real-time network traffic may need to be prioritized in the network (150). The real-time network traffic may include data packets related to, for example (but not limited to): videoconferencing, web browsing, voice over Internet Protocol (VOIP), etc.

As used herein, "communication" may refer to simple data passing, or may refer to two or more components coordinating a job. As used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

Although the system of FIG. 1.1 is shown as having a certain number of components (e.g., 110, 112, 114, 130, 130A, 130N, 150), in other embodiments disclosed herein, the system may have more or fewer components. For example, the functionality of each component described above may be split across components or combined into a single component. Further still, each component may be utilized multiple times to carry out an iterative operation.

FIG. 1.2 shows a diagram of a node in accordance with one or more embodiments disclosed herein. Node A (130A) may be an embodiment of the nodes (130A, 130N, FIG. 1.1) discussed above. As discussed above, node A (130A) may include the functionality to perform a portion of the computer implemented services provided by the cluster (130, FIG. 1.1). To perform the aforementioned services, node A (130A) may include a threat modeler interface (132), an operating system (OS) (134), components (136), processes (138), and storage (140). Node A (130A) may include fewer, additional, or other components without departing from embodiments disclosed herein. Each of the components of node A (130A) is discussed below.

In one or more embodiments, a threat modeler interface (132) may represent an application programming interface (API) (e.g., a communication channel, an entry point to the cluster, etc.) for the threat modeler (e.g., 110, FIG. 1.1)

and/or other nodes (e.g., 130N, FIG. 1.1) of the cluster (130, FIG. 1.1). To that extent, the threat modeler interface (132) may be configured to include the functionality to employ a set of subroutine definitions, protocols, and/or hardware/software components for enabling communications between node A (130A) and external entities (e.g., the threat modeler (e.g., 110, FIG. 1.1), other nodes (e.g., 130N, FIG. 1.1) of the cluster (130, FIG. 1.1), etc.). The threat modeler interface (132) may also be configured to include the functionality to receive and validate (in conjunction with the OS (134)) communications from external entities. The threat modeler interface (132) may include other and/or additional functionalities without departing from embodiments disclosed herein.

In one or more embodiments, the threat modeler interface (132) may be implemented as one or more physical devices. A physical device may include circuitry. A physical device may be, for example, a field-programmable gate array, application specific integrated circuit, programmable processor, microcontroller, digital signal processor, or other hardware processor. The physical device may be configured to provide the functionality of the threat modeler interface (132) described throughout this Detailed Description.

In one or more embodiments disclosed herein, the threat modeler interface (132) may be implemented as computer instructions, e.g., computer code, stored on a storage (e.g., 140) that when executed by a processor of node A (130A) causes node A (130A) to provide the functionality of the threat modeler interface (132) described throughout this Detailed Description.

In one or more embodiments, threat modeler interface (132) may be implemented using any combination of hardware and software without departing from embodiments disclosed herein.

In one or more embodiments, the OS (134) may refer to a computer program that may execute on the underlying hardware of node A (130A). Specifically, the OS (134) may be configured to include the functionality to facilitate node A (130A) operations. To that extent, the OS (134) may include functionality to, for example, support fundamental node A (130A) functions; schedule tasks; mediate interactivity between logical (e.g., software) and physical (e.g., hardware) node A (130A) components (e.g., 136); allocate node A (130A) resources; and execute or invoke other computer programs (e.g., processes (138)) executing on node A (130A). The OS (134) may include other and/or additional functionalities without departing from embodiments disclosed herein. The OS (134) may include a Linux operating system. The OS (134) may include any type of operating system without departing from embodiments disclosed herein.

In one or more embodiments, the OS (134) may be implemented as computer instructions, e.g., computer code, stored on a storage (e.g., 140) that when executed by a processor of node A (130A) causes node A (130A) to provide the functionality of the OS (134) described throughout this Detailed Description.

In one or more embodiments, the components (136) may refer to hardware components of node A (130A) that may include the functionalities to execute processes (138) of node A (130A). The components (136) may also include functionality to provide services (e.g., data storage services, memory services, etc.) for processes (138) executing on node A (130A). The components (136) may include other and/or additional functionalities without departing from embodiments disclosed herein. The components (136) may include any quantity and type of hardware components of a computing device as discussed above and in FIG. 4 without departing from embodiments disclosed herein. The components (136) may include any combination of components without departing from embodiments disclosed herein. There may be any quantity of components (136) without departing from embodiments disclosed herein. For example, the components may include component A (136A) and component N (136N). Component A (136A) may include a processor and component N (136N) may include a graphics processing unit.

In one or more embodiments, the processes (138) may include the functionality to perform the computer implemented services provided by node A (130A). The computer implemented services may be embodiments of the computer implemented services discussed above. The processes (138) may include any quantity and/or type of processes (138) without departing from embodiments disclosed herein. For example, node A (130A) may include process A (138A) and process N (138N). Each process (138A, 138N) may perform a portion of the computer implemented services of node A (130A). Each process (138A, 138N) may perform the same or different services without departing from embodiments disclosed herein. For example, process A (138A) may perform database services and process N (138N) may perform word processing services.

In one or more embodiments, the processes (138) may be implemented as computer instructions, e.g., computer code, stored on a storage (e.g., 140) that when executed by a processor of node A (130A) causes node A (130A) to provide the functionality of the processes (138) described throughout this Detailed Description.

In one or more embodiments, the storage (140) may be implemented using one or more volatile or non-volatile storages or any combination thereof. The storage (140) may include the functionality to, or otherwise be configured to, store and provide all, or portions, of information that may be used by node A (130A) and the components therein (e.g., 132, 134, 136, 138, etc.). The information stored in the storage (140) may include process data (142) and node information (144). The storage (140) may include other and/or additional information without departing from embodiments disclosed herein. Each of the aforementioned types of information is discussed below.

In one or more embodiments, the process data (142) may include one or more data structures that include data generated, obtained, and/or used by the processes (138) of node A (130A). The process data (142) may include any quantity and/or type of data without departing from embodiments disclosed herein. The process data (142) may include, for example, word processing data, database data, calendar data, inferencing data, machine learning model training data, etc. The process data (142) may be used by processes (138) to perform the computer implemented services of node A (130A). The process data (142) may include other and/or additional information and may be used for other and/or additional purposes without departing from embodiments disclosed herein.

In one or more embodiments, the node information (144) may include one or more data structures that include node information associated with the processes (138) of node A (130A). The node information may be generated by the OS (134), the components (136), and/or the processes (138) and provided to the threat modeler (110, FIG. 1.1) to perform threat modeling. The node information (144) may be embodiments of the node information included in the node information repository (118, FIG. 2) discussed below. For additional information associated with the node information (144), refer to FIG. 2. The node information (144) may include other and/or additional information and may be used for other and/or additional purposes without departing from embodiments disclosed herein.

While the data structures (e.g., 142, 144) and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (140), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

FIG. 2 shows a node information repository in accordance with one or more embodiments disclosed herein. The node information repository (118) may be an embodiment of the node information repository (118, FIG. 1.1) discussed above. The node information repository (118) may include any quantity of process entries (e.g., 200A, 200B, 200N). For example, the node information repository (118) may include process entry A (200A), process entry B (200B), process entry N (200N), etc. The node information repository (118) may include other and/or additional information without departing from embodiments disclosed herein. Each process entry (e.g., 200A, 200B, 200N) may be associated with a process (e.g., 138A, FIG. 1.2) executing on a node (e.g., 130A, FIG. 1.1) of the cluster (130, FIG. 1.1). Each process entry (e.g., 200A, 200B, 200N) may include node information associated with the corresponding process. The node information may include internal components (202), external components (204), data storage information (206), a process tree (208), node configuration information (210), a memory map (212), and/or communication information (214). The process entries (e.g., 200A, 200B, 200N) may include other and/or additional information without departing from embodiments disclosed herein. Each of the aforementioned types of information included in the process entries (e.g., 200A, 200B, 200N) is discussed below.

In one or more embodiments, the internal components (202) may include one or more data structures that include information associated with the components (e.g., 136, FIG. 1.2) and/or other processes (e.g., 138, FIG. 1.2) of the same node that execute and/or communicate with the process corresponding to the process entry (e.g., 200A). The internal components (202) may include component identifiers. A component identifier may refer to unique combination of alphanumeric characters associated with a particular component that specifies the particular component from other components. The internal components (202) may also or alternatively include process identifiers. A process identifier may refer to unique combination of alphanumeric characters associated with a particular process that specifies the particular process from other processes. The internal components (202) may be generated by the node (130A, FIG. 1.2) executing the corresponding process or components therein (e.g., the threat modeler interface (132, FIG. 1.2), OS (e.g., 134, FIG. 1.2), components (136, FIG. 1.2), the processes (138, FIG. 1.2), etc.). The internal components (202) may be generated by other components of the system of FIG. 1.1 without departing from embodiments disclosed herein. The internal components (202) may be used by the threat modeler (110, FIG. 1.1) to perform threat modeling. The internal components (202) may include other and/or additional information and may be used for other and/or additional purposes without departing from embodiments disclosed herein.

In one or more embodiments, the external components (204) may include one or more data structures that include information associated with the components (e.g., 136, FIG. 1.2) and/or other processes (e.g., 138, FIG. 1.2) of different nodes (nodes that do not execute the process) that communicate with the process corresponding to the process entry (e.g., 200A). The external components (204) may include process identifiers. A process identifier may refer to unique combination of alphanumeric characters associated with a particular process that specifies the particular process from other processes. The external components (204) may be generated by the node (130A, FIG. 1.2) executing the corresponding process or components therein (e.g., the threat modeler interface (132, FIG. 1.2), OS (e.g., 134, FIG. 1.2), components (136, FIG. 1.2), the processes (138, FIG. 1.2), etc.). The external components (204) may be generated by other components of the system of FIG. 1.1 without departing from embodiments disclosed herein. The external components (204) may be used by the threat modeler (110, FIG. 1.1) to perform threat modeling. The external components (204) may include other and/or additional information and may be used for other and/or additional purposes without departing from embodiments disclosed herein.

In one or more embodiments, the data storage information (206) may include one or more data structures that include information with files and/or databases associated with the process corresponding to the process entry (e.g., 200A). The information may include, file identifiers, file descriptors assigned by the process associated with each file, a file owner identifier (e.g., user identifier associated with user that owns the file, a group identifier, file permissions (e.g., user identifiers and corresponding user access rights such as read only access, read and modify access, etc.). The information may further a file type associated with each file and a description of the contents of the file. The file type may include OS specific file types such as regular files, directory files, link files, character special files, block special files, socket files, and named pipe files, etc. and/or process specific files (e.g., text files, calendar files, electronic communication files, etc.). The content descriptions may include any quantity of human readable text that describes the contents of the file. The information may further indicate (e.g., via a tag, flag, or other indicator) whether each file or database is encrypted and the corresponding encryption technique used for encryption. The files and databases may be encrypted using any appropriate encryption technique (e.g., Advanced Encryption Standard (AES), Triple Data Encryption Standard (DES), Blowfish, etc.) without departing from embodiments disclosed herein. The information may further include the storage device identifier and storage device type associated with each file that specifies the storage that stores the file and a security indicator corresponding to the storage device. The security indicator may specify how secure the storage device is. The security indicator may include any representation (e.g., numerical representation, categories such as high, medium, low, etc.) of security without departing from embodiments disclosed herein.

The data storage information (206) may be generated by the node (130A, FIG. 1.2) executing the corresponding process or components therein (e.g., the threat modeler interface (132, FIG. 1.2), OS (e.g., 134, FIG. 1.2), components (136, FIG. 1.2), the processes (138, FIG. 1.2), etc.). The data storage information (206) may be generated by other components of the system of FIG. 1.1 without departing from embodiments disclosed herein. The data storage information (206) may be used by the threat modeler (110, FIG. 1.1) to perform threat modeling. The data storage information (206) may include other and/or additional information and may be used for other and/or additional purposes without departing from embodiments disclosed herein.

In one or more embodiments, the process tree (208) may include one or more data structures that include hierarchy information associated with the process corresponding to the process entry (e.g., 200A). The hierarchy information may specify the sub-processes associated with the process and processes for which the process corresponding to the process entry (e.g., 200A) is a sub-process. As used herein, a sub-process is a process that is invoked or caused to execute by another process (e.g., a parent process). As used herein, a parent process of a sub-process is a process that invoked the sub-process. The hierarchy information may include the levels associated with each process in the process tree (208), the process identifier associated with each process in the process tree (208), and the owner (e.g., user identifier, system identifier if a system run process, etc.) associated with each process in the process tree (208), the parent processes associated with each process in the process tree (208), and the sub-processes associated with each process in the process tree (208). The process tree (208) may include all of the process executing in the cluster (130, FIG. 1.1) or only on the node executing the process corresponding to the process entry (e.g., 200A). The process tree (208) may include all processes associated with the process corresponding with the process entry (e.g., 200A) executing on any node in the cluster (130, FIG. 1.1) (e.g., the sub-processes and parent processes of each process in the same branch of the process tree (208) as the process corresponding to the process entry (e.g., 204).

The process tree (208) may be generated by the node (130A, FIG. 1.2) executing the corresponding process or components therein (e.g., the threat modeler interface (132, FIG. 1.2), OS (e.g., 134, FIG. 1.2), components (136, FIG. 1.2), the processes (138, FIG. 1.2), etc.). The process tree (208) may be generated by other components of the system of FIG. 1.1 without departing from embodiments disclosed herein. The process tree (208) may be used by the threat modeler (110, FIG. 1.1) to perform threat modeling. The process tree (208) may include other and/or additional information and may be used for other and/or additional purposes without departing from embodiments disclosed herein.

In one or more embodiments, the node configuration information (210) may include one or more data structures that include configuration information and user information associated with the process corresponding to the process entry (e.g., 200A). The configuration information may include information associated with the node on which the process corresponding with the process entry (e.g., 204) is executing. The configuration information may include a node identifier associated with the node, component identifiers and components types associated with the components of the node, and/or storage identifiers and storage types associated with storages of the node. The configuration information may include other and/or additional information associated with the node on which the process corresponding with the process entry (e.g., 204) is executing without departing from embodiments disclosed herein. The user information may include information associated with users of the node on which the process corresponding with the process entry (e.g., 204) and/or users of the process corresponding with the process entry (e.g., 204). The user information may include user identifiers, group identifiers, user activity logs specifying actions performed by the users on the node, user permissions and access control lists associated with the users/groups, and/or the users included in each group associated with the process. The user information may include other and/or additional information associated with the users corresponding with the process corresponding with the process entry (e.g., 204) without departing from embodiments disclosed herein.

The node configuration information (210) may be generated by the node (130A, FIG. 1.2) executing the corresponding process or components therein (e.g., the threat modeler interface (132, FIG. 1.2), OS (e.g., 134, FIG. 1.2), components (136, FIG. 1.2), the processes (138, FIG. 1.2), etc.). The node configuration information (210) may be generated by other components of the system of FIG. 1.1 without departing from embodiments disclosed herein. The node configuration information (210) may be used by the threat modeler (110, FIG. 1.1) to perform threat modeling. The node configuration information (210) may include other and/or additional information and may be used for other and/or additional purposes without departing from embodiments disclosed herein.

In one or more embodiments, the memory map (212) may include one or more data structures that include memory information associated with the memory usage of the process corresponding with the process entry (e.g., 204). The memory information may include a mapping of files associated with the process and memory devices and locations (e.g., registers, pointers, memory blocks, etc.) in the memory devices of the node executing the process that include the data of the files. The memory information may include the memory device identifiers, the memory storage locations, and the file identifiers. The memory map (212) may be generated by the node (130A, FIG. 1.2) executing the corresponding process or components therein (e.g., the threat modeler interface (132, FIG. 1.2), OS (e.g., 134, FIG. 1.2), components (136, FIG. 1.2), the processes (138, FIG. 1.2), etc.). The memory map (212) may be generated by other components of the system of FIG. 1.1 without departing from embodiments disclosed herein. The memory map (212) may be used by the threat modeler (110, FIG. 1.1) to perform threat modeling. The memory map (212) may include other and/or additional information and may be used for other and/or additional purposes without departing from embodiments disclosed herein.

In one or more embodiments, the communication information (214) may include one or more data structures that include information regarding network communications to external components associated with the process corresponding with the process entry (e.g., 204). The information may include network information such as network protocol identifiers associated with the network protocols used for communication. Any network protocol may be used for communication without departing from embodiments disclosed herein. The network information may further specify whether the network protocol is a routable network protocol or a hop-to-hop network protocol. The information may further include encryption information that may indicate (e.g., via a tag, flag, or other indicator) whether communications are encrypted and the corresponding encryption technique used for encryption. The communications may be encrypted using any appropriate encryption technique (e.g., Advanced Encryption Standard (AES), Triple Data Encryption Standard (DES), Blowfish, etc.) without departing from embodiments disclosed herein. The information may further include a security information including a security indicator corresponding to the network protocol. The security indicator may specify how secure the network protocol is and any common network attacks to which the network protocol may be susceptible. The security indicator may include any representation (e.g., numerical representation, categories such as high, medium, low, etc.) of security without departing from embodiments disclosed herein. The communication information may further include authentication information associated with the network communications to external components or users associated with the process corresponding with the process entry (e.g., 204). The authentication information may specify the one or more types of authentication used (e.g., username and password authentication, biometric authentication, digital certificate authentication, etc.), if any, and the corresponding authentication tools (e.g., the username and passwords, the biometrics, the certificates, etc.) used during authentication. The authentication information may further specify how often the authentication tools are updated and corresponding expiration dates, how the certificates are signed (e.g., by a root certificate authority, self-signed, etc.), etc.

The communication information (214) may be generated by the node (130A, FIG. 1.2) executing the corresponding process or components therein (e.g., the threat modeler interface (132, FIG. 1.2), OS (e.g., 134, FIG. 1.2), components (136, FIG. 1.2), the processes (138, FIG. 1.2), etc.). The communication information (214) may be generated by other components of the system of FIG. 1.1 without departing from embodiments disclosed herein. The memory map (212) may be used by the threat modeler (110, FIG. 1.1) to perform threat modeling. The communication information (214) may include other and/or additional information and may be used for other and/or additional purposes without departing from embodiments disclosed herein.

FIG. 3.1 shows a flowchart of a method for performing threat modeling in accordance with one or more embodiments disclosed herein. The method shown in FIG. 3.1 may be performed by, for example, a threat modeler (e.g., 110, FIG. 1.1). Other components of the system in FIGS. 1.1-1.2 may perform all, or a portion, of the method of FIG. 3.1 without departing from the scope of the embodiments described herein. While FIG. 3.1 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 300, a threat modeling request associated with a process executing on a node is obtained. In one or more embodiments, the request may include the process identifier corresponding with the process targeted by the threat modeling request. The request may further include a node identifier, a network address, and/or any other information associated with the node executing the process such that the threat modeler may be able to communicate with the node. In one or more embodiments, the threat modeler may obtain the request from a node of the cluster or from a user. In embodiments in which the request is obtained from a user, the user may provide the request directly to the threat modeler via one or more inputs submitted through a user interface. The user interface may be any type of user interface without departing from embodiments disclosed herein. For example, the user interface may be a graphical user interface (GUI), a command line interface (CLI), etc. In alternative embodiments, the user may provide the request indirectly through a computing device (e.g., a client, not shown in system of FIG. 1.1). In embodiments in which the request is obtained from a client or a node, the request may be obtained from a node or a client using any appropriate method of data transmission without departing from embodiments disclosed herein. For example, the request may be sent a message including one or more network packets through one or more network devices that operatively connect the threat modeler to the node or client. The threat modeling request associated with the process executing on the node may be obtained via other and/or additional methods without departing from embodiments disclosed herein.

In Step 302, node information associated with the process is generated. In one or more embodiments, the threat modeler may generate node information associated with the process via the methods discussed in FIG. 3.2. For additional information regarding generating node information associated with the process, refer to FIG. 3.2.

In Step 304, a data flow diagram associated with the process is generated using the node information. In one or more embodiments, the threat modeler may generate the data flow diagram using the node information associated with the process. The node information may specify the internal and external components associated with the process, files and/or databases generated, used, or obtained by the process, the process tree associated with the process. The threat modeler may extract the data flow diagram from the internal and external components associated with the process, files and/or databases generated, used, or obtained by the process, the process tree associated with the process. The data flow diagram may be one or more data structures that specify (through textual and/or visual representation) the flow of data throughout the execution of the process. The data flow diagram may specify each parent process and sub-process associated with the process, the data (e.g., files, databases, etc.) used as inputs for each parent process and sub-process (including the targeted process), the data generated as a result of the execution of each parent process and sub-process (including the targeted process), and the nodes and components that execute each process or are used by each process in the order in which they are executed. The data flow diagram may include other and/or additional information without departing from embodiments disclosed herein. The data flow diagram associated with the process may be generated using the node information via other and/or additional information without departing from embodiments disclosed herein.

In Step 306, the node information is compared with the threat database to identify at least one threat associated with the process. In one or more embodiments, the threat modeler may compare the node information associated with the process included in the node information repository with the corresponding node information included in the threat database. If the node information matches the node information in the threat database that is associated with a threat, then the threat modeler may identify a threat associated with the process. In one or more embodiments, the threat modeler may check to see if all of the node information matches (e.g., require a complete match). In alternative embodiments, the threat modeler may check to see if a portion of the node information matches (e.g., require a partial match). The amount or portion of the node information required to match to identify a threat may be configurable by a user (e.g., system administrator). For example, the portion required to match may be the condition associated with the threat. In one or more embodiments, the threat modeler may identify all threats that include threat information that matches the node information. Any quantity of threats, including zero, may be identified without departing from embodiments disclosed herein. The node information may be compared with the threat database to identify at least one threat associated with the process via other and/or additional methods without departing from embodiments disclosed herein.

In Step 308, a threat report is generated based on the at least one threat. In one or more embodiments, the threat modeler may generate the threat report associated with each identified threat in Step 306. The threat report may be one or more data structures that include information associated with the identified threats. The threat modeler may generate the threat report using the threat database and the node information. For each threat, the threat report may specify the threat and the threat information included in the threat database associated with the threat. The threat modeler may also include the node information associated with the process in the threat report. In one or more embodiments, if not threats were identified, then the threat report may indicate that no threats were identified. The threat report may be generated based on the at least one threat via other and/or additional methods without departing from embodiments disclosed herein.

In Step 310, the threat report and the data flow diagram are provided to a user associated with the process. In one or more embodiments, the threat modeler may provide the data flow diagram and the threat report to the user directly or indirectly. In one embodiment, the data flow diagram and the threat report may be provided to the user via displaying the threat report and the data flow diagram through a user interface. The user interface may be any type of user interface without departing from embodiments disclosed herein. For example, the user interface may be a graphical user interface (GUI), a command line interface (CLI), etc. In alternative embodiments, the threat modeler may provide the threat report and the data flow indirectly through a computing device (e.g., the node, a client, not shown in system of FIG. 1.1, etc.) used by the user. In embodiments in which the threat report and the data flow is provided to the client or the node, the threat report and the data flow may be provided from to the node or the client using any appropriate method of data transmission without departing from embodiments disclosed herein. For example, the threat report and the data flow may be sent as one or more messages including one or more network packets through one or more network devices that operatively connect the threat modeler to the node or client. As such, the threat report and data flow diagram may provide a comprehensive view of threats, information associated with threats (e.g., severity, suggested mitigation steps, conditions, etc.) associated with an executing process in the cluster, and the potential impacts to other processes based on the threats via the data flow diagram. The threat modeling request associated with the process executing on the node may be obtained via other and/or additional methods without departing from embodiments disclosed herein.

In Step 312, threat mitigation is performed based on the threat report and the data flow diagram. As discussed above, the threat information associated with each threat may include one or more mitigation steps that may specify one or more actions to perform to remediate or mitigate the harm of the corresponding threat. In one or more embodiments, the threat modeler may identify the mitigations steps associated with each threat using the corresponding threat information. The threat modeler may then perform, or initiate the performance, of the identified mitigation steps. For example, the threat modeler may perform, or initiate the performance of, the following steps: removing unknown user from data file permissions, updating user credentials, closing ports associated with processes, changing data file types, changing authentication methods, adding authentication methods, etc. Threat mitigation may be performed based on the threat report and the data flow diagram via other and/or additional methods without departing from embodiments disclosed herein.

In one or more embodiments disclosed herein, the method ends following Step 312.

FIG. 3.2 shows a flowchart of a method for generating node information in accordance with one or more embodiments disclosed herein. The method shown in FIG. 3.2 may be performed by, for example, a threat modeler (e.g., 110, FIG. 1.1). Other components of the system in FIGS. 1.1-1.2 may perform all, or a portion, of the method of FIG. 3.2 without departing from the scope of the embodiments described herein. While FIG. 3.2 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 320, external components associated with the process are identified. In one or more embodiments, the threat modeler may send a request to the node associated with the process. The request may include a request for external components associated with process. In response to obtaining the request, the node may identify the external components associated with process and generate a data structure specifying the external components. The node may identify the external components by listening to one or more network sockets for connections and/or connection attempts associated with the process. After generating the external components, the node may provide the internal components to the threat modeler. The request and external components may be transmitted using any appropriate method of data transmission without departing from embodiments disclosed herein. For example, the request and external components may be sent as messages that include one or more network packets through one or more network devices that operatively connect the node and the threat modeler. The external components associated with the process may be identified via other and/or additional methods without departing from embodiments disclosed herein.

In Step 322, internal components associated with the process are identified. In one or more embodiments, the threat modeler may send a request to the node associated with the process. The request may include a request for internal components associated with process. In response to obtaining the request, the node may identify the internal components associated with process and generate a data structure specifying the internal components. The node may identify the internal components using one or more operating system commands (e.g., "ipcs") that provide information associated with inter-process communications. After generating the internal components, the node may provide the internal components to the threat modeler. The request and internal components may be transmitted using any appropriate method of data transmission without departing from embodiments disclosed herein. For example, the request and internal components may be sent as messages that include one or more network packets through one or more network devices that operatively connect the node and the threat modeler. The internal components associated with the process may be identified via other and/or additional methods without departing from embodiments disclosed herein.

In Step 324, data storage information associated with the process is identified. In one or more embodiments, the threat modeler may send a request to the node associated with the process. The request may include a request for data storage information associated with process. In response to obtaining the request, the node may parse the storage and the process data associated with the process and generate a data structure specifying the data storage information. After generating the data storage information, the node may provide the data storage information to the threat modeler. The request and data storage information may be transmitted using any appropriate method of data transmission without departing from embodiments disclosed herein. For example, the request and data storage information may be sent as messages that include one or more network packets through one or more network devices that operatively connect the node and the threat modeler. The data storage information associated with the process may be identified via other and/or additional methods without departing from embodiments disclosed herein.

In Step 326, a process tree associated with the process is obtained. In one or more embodiments, the threat modeler may send a request to the node associated with the process. The request may include a request for a process tree associated with process. In response to obtaining the request, the node may generate a process tree associated with the process. The node may generate a process tree using one or more operating system commands (e.g., "ps") that obtain and specify hierarchical process information. After generating the process tree, the node may provide the process tree to the threat modeler. The request and process tree may be transmitted using any appropriate method of data transmission without departing from embodiments disclosed herein. For example, the request and process tree may be sent as messages that include one or more network packets through one or more network devices that operatively connect the node and the threat modeler. The process tree associated with the process may be obtained via other and/or additional methods without departing from embodiments disclosed herein.

In Step 328, a node configuration associated with the process is obtained. In one or more embodiments, the threat modeler may send a request to the node associated with the process. The request may include a request for node configuration information associated with process. In response to obtaining the request, the node may obtain and/or generate node configuration information associated with the process. The node may generate a process tree using one or more operating system commands that obtain and specify configuration information and user information that are included in the node configuration information. After generating the process tree, the node may provide the process tree to the threat modeler. The request and node configuration information may be transmitted using any appropriate method of data transmission without departing from embodiments disclosed herein. For example, the request and node configuration information may be sent as messages that include one or more network devices that operatively connect the node and the threat modeler. The node configuration information associated with the process may be obtained via other and/or additional methods without departing from embodiments disclosed herein.

In Step 330, a memory map associated with the process is generated. In one or more embodiments, the threat modeler may send a request to the node associated with the process. The request may include a request for a memory map associated with process. In response to obtaining the request, the node may obtain and/or generate a memory map associated with the process. The node may generate a memory map using one or more operating system commands that obtain and specify configuration information and user information that are included in the node configuration information. After generating the memory map, the node may provide the memory map to the threat modeler. The request and memory map may be transmitted using any appropriate method of data transmission without departing from embodiments disclosed herein. For example, the request and memory map may be sent as messages that include one or more network packets through one or more network devices that operatively connect the node and the threat modeler. The memory map associated with the process may be generated via other and/or additional methods without departing from embodiments disclosed herein.

In Step 332, communication information associated with the process is generated. The communication information associated with the process may be generated via the methods discussed in FIG. 3.3. For additional information regarding generating the communication information associated with the process, refer to FIG. 3.3.

In Step 334, node information associated with the process is generated using the information collected in Steps 320-332. In one or more embodiments, threat modeler may generate node information by collating the internal components, external components, data storage information, process tree, node configuration information, memory map, and communication information. The threat modeler may generate or update an existing process entry in the node information repository and include the process identifier, internal components, external components, data storage information, process tree, node configuration information, memory map, and communication information in the process entry. As such the process entry may be used to compare the node information with threat information in the threat database during threat modeling (e.g., see FIG. 3.1). The node information associated with the process may be generated using the information collected in Steps 320-332 via other and/or additional methods without departing from embodiments disclosed herein.

In one or more embodiments disclosed herein, the method ends following Step 334.

FIG. 3.3 shows a flowchart of a method for generating communication information in accordance with one or more embodiments disclosed herein. The method shown in FIG. 3.3 may be performed by, for example, a simulator (e.g., 110, FIG. 1.1). Other components of the system in FIGS. 1.1-1.2 may perform all, or a portion, of the method of FIG. 3.3 without departing from the scope of the embodiments described herein. While FIG. 3.3 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 340, network information associated with the process is obtained. In one or more embodiments, the threat modeler may send a request to the node associated with the process. The request may include a request for network information associated with process. In response to obtaining the request, the node may obtain and/or generate network information associated with the process. The node may obtain or generate network information using one or more operating system commands that obtain and/or generate network information. After generating the network information, the node may provide the network information to the threat modeler. The request and network information may be transmitted using any appropriate method of data transmission without departing from embodiments disclosed herein. For example, the request and network information may be sent as messages that include one or more network packets through one or more network devices that operatively connect the node and the threat modeler. The network information associated with the process may be identified via other and/or additional methods without departing from embodiments disclosed herein.

In Step 342, security information associated with the process is identified. In one or more embodiments, the threat modeler may send a request to the node associated with the process. The request may include a request for security information associated with process. In response to obtaining the request, the node may obtain and/or generate security information associated with the process. The node may obtain or generate network information using one or more operating system commands that obtain and/or generate security information. After generating the security information, the node may provide the security information to the threat modeler. The request and security information may be transmitted using any appropriate method of data transmission without departing from embodiments disclosed herein. For example, the request and security information may be sent as messages that include one or more network packets through one or more network devices that operatively connect the node and the threat modeler.

In additional or alternative embodiments, the security information may be obtained from users and/or manufactures using the network information obtained in Step 340. The threat modeler may include or be operatively connected to storage that includes security information associated with various types of network information provided by a user and/or a manufacturer previously or upon request. The threat modeler may compare the network information to identify a portion of the security information that matches the network information and identify the matching portion of the security information as the security information. The security information associated with the process may be identified via other and/or additional methods without departing from embodiments disclosed herein.

In Step 344, encryption information associated with the process is identified. In one or more embodiments, the threat modeler may send a request to the node associated with the process. The request may include a request for encryption information associated with process. In response to obtaining the request, the node may obtain and/or generate encryption information associated with the process. The node may obtain or generate encryption information using one or more operating system commands that obtain and/or generate encryption information. After generating the encryption information, the node may provide the encryption information to the threat modeler. The request and encryption information may be transmitted using any appropriate method of data transmission without departing from embodiments disclosed herein. For example, the request and encryption information may be sent as messages that include one or more network packets through one or more network devices that operatively connect the node and the threat modeler. The encryption information associated with the process may be identified via other and/or additional methods without departing from embodiments disclosed herein.

In Step 346, authentication information associated with the process is identified. In one or more embodiments, the threat modeler may send a request to the node associated with the process. The request may include a request for authentication information associated with process. In response to obtaining the request, the node may obtain and/or generate authentication information associated with the process. The node may obtain or generate authentication information using one or more operating system commands that obtain and/or generate authentication information. After generating the authentication information, the node may provide the authentication information to the threat modeler. The request and authentication information may be transmitted using any appropriate method of data transmission without departing from embodiments disclosed herein. For example, the request and authentication information may be sent as messages that include one or more network packets through one or more network devices that operatively connect the node and the threat modeler. The authentication information associated with the process may be identified via other and/or additional methods without departing from embodiments disclosed herein.

In Step 348, communication information is generated based on the network information, the security information, the encryption information, and the authentication information. In one or more embodiments, threat modeler may generate communication information by collating the network information, the security information, the encryption information, and the authentication information. The threat modeler may generate communication information or update existing communication associated with the process by including the network information, the security information, the encryption information, and the authentication information. As such the communication information may be used to generate node information associated with the process (e.g., see FIG. 3.2). The communication information associated with the process may be generated based on based on the network information, the security information, the encryption information, and the authentication information via other and/or additional methods without departing from embodiments disclosed herein.

In one or more embodiments disclosed herein, the method ends following Step 348.

Figure 4:
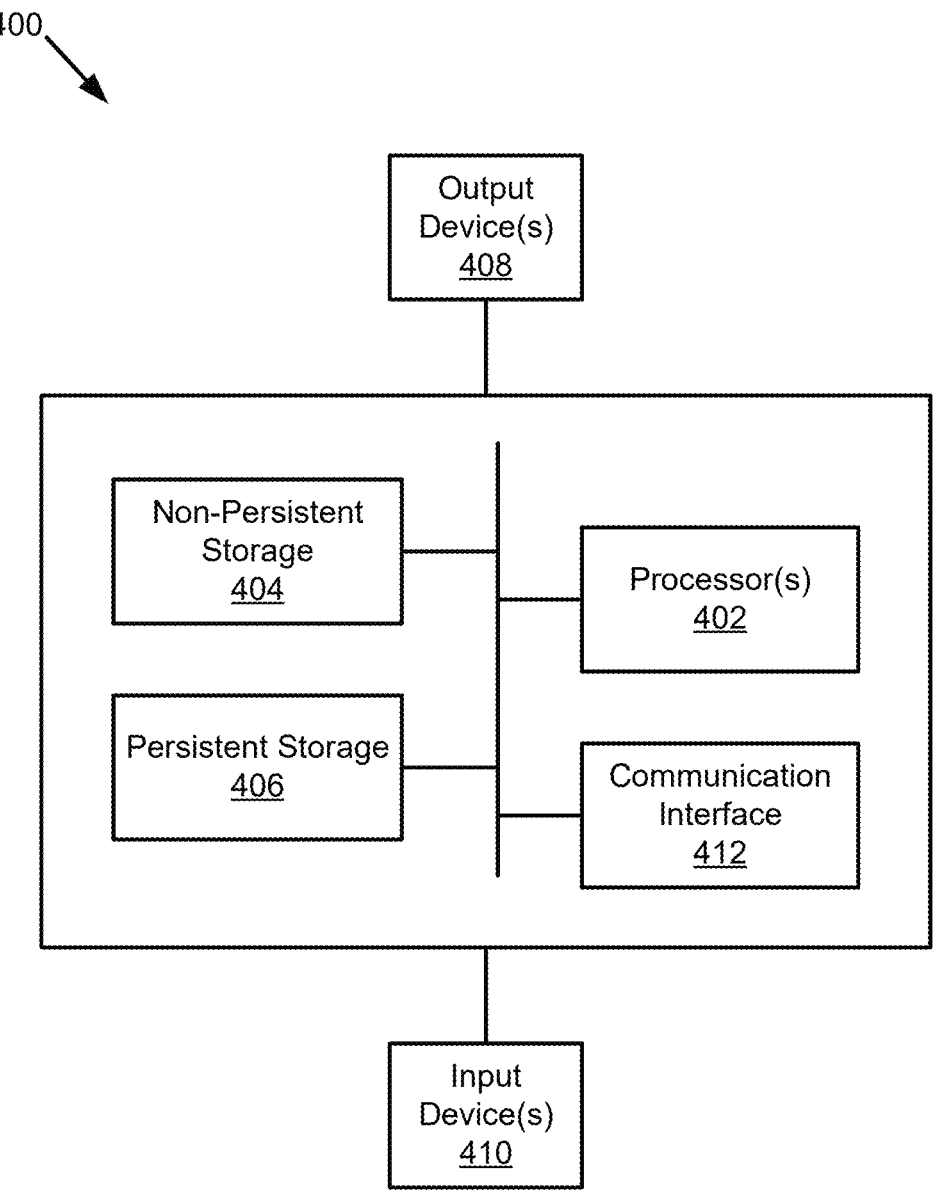
FIG. 4 shows a diagram of a computing device in accordance with one or more embodiments disclosed herein.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile storage, such as random access memory (RAM), cache memory), persistent storage (406) (e.g., non-volatile storage such as a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

As used herein, an entity that is programmed to, or configured to, perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

As used herein, an identifier associated with an entity may refer to a unique combination of alphanumeric characters that may be used to specify the entity from other entities of the same type. The identifier may include any combination of alphanumeric characters without departing from embodiments disclosed herein. The identifier may be global (known to all components of the system) or local (e.g., component specific such as a file identifier local to a computing device that is not known to other computing devices) without departing from embodiments disclosed herein.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for performing threat modeling, comprising:
obtaining a threat modeling request associated with a process executing on a node of a cluster;
in response to the obtaining:
generating node information associated with the process, wherein generating node information comprises:
identifying external components and internal components associated with the process,
identifying data storage information associated with the process,
obtaining a process tree associated with the process,
obtaining a node configuration associated with the process,
generating a memory map associated with the process,
generating communication information associated with the process, and
generating the node information using the external components, the internal components, the data storage information, the process tree, the node configuration, the memory map, and the communication information;
generating a data flow diagram associated with the process using the node information;
comparing the node information with a threat database to predict at least one threat associated with the process;
generating a threat report based on the at least one threat;
providing the threat report and data flow diagram to a user associated with the process; and
initiating performance of threat mitigation based on the threat report and the data flow diagram.

2. The method of claim 1, wherein the threat database comprises:
a plurality of threats; and
threat information associated with each of the plurality of threats.

3. The method of claim 2, wherein threat information associated with a threat of the plurality of threats comprises:
a threat identifier associated with the threat,
corresponding node information associated with the threat,
a process associated with the threat,
at least one component associated with the threat,
a description of the threat,
a severity associated with the threat, and
at least one mitigation step to perform to mitigate the threat.

4. The method of claim 2, wherein the threat database is updated over time to include new threats, update threat information, and remove threats.

5. The method of claim 1, wherein the data flow diagram specifies the internal components and external components that process data associated with the process during execution of the process.

6. The method of claim 1, wherein generating communication information comprises:

obtaining network information associated with the process;

identifying security information associated with the process;

identifying encryption information associated with the process;

identifying authentication information associated with the process; and generating communication information based on the network information, the security information, the encryption information, and the authentication information.

7. A non-transitory computer readable medium comprising computer readable program code, which when executed by a computer processor enables the computer processor to perform a method for performing threat modeling, the method comprising:

obtaining a threat modeling request associated with a process executing on a node of a cluster;

in response to the obtaining:

generating node information associated with the process, wherein generating the node information comprises:

identifying external components and internal components associated with the process, identifying data storage information associated with the process, obtaining a process tree associated with the process, obtaining a node configuration associated with the process, generating a memory map associated with the process, generating communication information associated with the process, and generating the node information using the external components, the internal components, the data storage information, the process tree, the node configuration, the memory map, and the communication information;

generating a data flow diagram associated with the process using the node information;

comparing the node information with a threat database to predict at least one threat associated with the process;

generating a threat report based on the at least one threat;

providing the threat report and data flow diagram to a user associated with the process; and initiating performance of threat mitigation based on the threat report and the data flow diagram.

8. The non-transitory computer readable medium of claim 7, wherein the threat database comprises:

a plurality of threats; and threat information associated with each of the plurality of threats.

9. The non-transitory computer readable medium of claim 8, wherein threat information associated with a threat of the plurality of threats comprises:

a threat identifier associated with the threat, corresponding node information associated with the threat, a process associated with the threat, at least one component associated with the threat, a description of the threat, a severity associated with the threat, and at least one mitigation step to perform to mitigate the threat.

10. The non-transitory computer readable medium of claim 8, wherein the threat database is updated over time to include new threats, update threat information, and remove threats.

11. The non-transitory computer readable medium of claim 7, wherein the data flow diagram specifies the internal components and external components that process data associated with the process during execution of the process.

12. The non-transitory computer readable medium of claim 7, wherein generating communication information comprises:

obtaining network information associated with the process;

identifying security information associated with the process;

identifying encryption information associated with the process;

identifying authentication information associated with the process; and generating communication information based on the network information, the security information, the encryption information, and the authentication information.

13. A system for performing threat modeling, comprising:

a cluster comprising a plurality of nodes; and a threat modeler operatively connected to the cluster, comprising a processor and a memory, wherein the memory comprises computing instructions which when executed by the processor causes the processor to perform a method for threat modeling, the method comprising:

obtaining a threat modeling request associated with a process executing on a node of the plurality of nodes;

in response to the obtaining:

generating node information associated with the process, wherein generating the node information comprises:

identifying external components and internal components associated with the process, identifying data storage information associated with the process, obtaining a process tree associated with the process, obtaining a node configuration associated with the process, generating a memory map associated with the process, generating communication information associated with the process, and generating the node information using the external components, the internal components, the data storage information, the process tree, the node configuration, the memory map, and the communication information;

generating a data flow diagram associated with the process using the node information;

comparing the node information with a threat database to predict at least one threat associated with the process;

generating a threat report based on the at least one threat;

providing the threat report and data flow diagram to a user associated with the process; and initiating performance of threat mitigation based on
the threat report and the data flow diagram.

14. The system of claim 13, wherein the threat database
comprises:

a plurality of threats; and threat information associated with each of the plurality of
threats.

15. The system of claim 14, wherein threat information
associated with a threat of the plurality of threats comprises:

a threat identifier associated with the threat, corresponding node information associated with the
threat, a process associated with the threat, at least one component associated with the threat, a description of the threat, a severity associated with the threat, and at least one mitigation step to perform to mitigate the
threat.

16. The system of claim 14, wherein the threat database
is updated over time to include new threats, update threat
information, and remove threats.

17. The system of claim 8, wherein the data flow diagram
specifies the internal components and external components
that process data associated with the process during execu-
tion of the process.

\* \* \* \* \*